(12) United States Patent
Hall

(10) Patent No.: US 11,124,251 B2
(45) Date of Patent: Sep. 21, 2021

(54) DEVICE FOR ATTACHING A CRAWLER TRACK MEMBER OF A CRAWLER TRACK TO A CRAWLER BELT OF THE CRAWLER TRACK

(71) Applicant: Hans Hall GmbH, Weingarten (DE)

(72) Inventor: Hans Hall, Weingarten (DE)

(73) Assignee: Hans Hall GmbH, Weingarten (DE)

( * ) Notice: Subject to any disclaimer, the term of this patent is extended or adjusted under 35 U.S.C. 154(b) by 0 days.

(21) Appl. No.: 17/156,942

(22) Filed: Jan. 25, 2021

(65) Prior Publication Data

US 2021/0139093 A1  May 13, 2021

Related U.S. Application Data

(63) Continuation of application No. PCT/EP2019/054256, filed on Feb. 21, 2019.

(30) Foreign Application Priority Data

Jul. 31, 2018  (DE) .................... 20 2018 104 420.6

(51) Int. Cl.
*B62D 55/26* (2006.01)
*B62D 55/24* (2006.01)
*B62D 55/28* (2006.01)

(52) U.S. Cl.
CPC .............. *B62D 55/26* (2013.01); *B62D 55/24* (2013.01); *B62D 55/28* (2013.01)

(58) Field of Classification Search
CPC ........ B62D 55/24; B62D 55/26; B62D 55/28; B62D 55/286; B62D 55/32
See application file for complete search history.

(56) References Cited

U.S. PATENT DOCUMENTS 3,838,894 A    10/1974  Reedy
3,899,220 A *   8/1975  Grawey ................. B62D 55/28
                                                152/185.1

(Continued)

FOREIGN PATENT DOCUMENTS

WO         01/08963 A1    2/2001

OTHER PUBLICATIONS

International Search Report and Written Opinion (Application No. PCT/EP2019/054256) dated May 24, 2019.

(Continued)

*Primary Examiner* — Kip T Kotter
(74) *Attorney, Agent, or Firm* — Burr & Brown, PLLC

(57) ABSTRACT

A device for attaching a crawler track member of a crawler track to a crawler belt of the crawler track having a press-in element and a connection element, wherein the press-in element comprises a main body having a continuous opening, wherein when the press-in element is arranged on the crawler belt, the connection element for connecting the crawler track member to the crawler belt engages through the continuous opening. The device is characterized in that the press-in element comprises multiple holding elements projecting from the main body, wherein the holding elements are configured in such a manner that when they are arranged on the crawler belt they penetrate multiple material layers of the crawler belt, in that the holding elements displace material of the material layers, in particular transversely to the penetration direction.

14 Claims, 2 Drawing Sheets

(56) References Cited

U.S. PATENT DOCUMENTS

| | | | |
|---|---|---|---|
| 4,938,546 A | | 7/1990 | Simmons |
| 5,033,801 A | | 7/1991 | Beeley |
| 5,188,441 A | * | 2/1993 | Rubel .................... B62D 55/26 |
| | | | 305/165 |
| 5,273,551 A | * | 12/1993 | Brehme .................... D06P 3/66 |
| | | | 8/500 |
| 5,284,286 A | * | 2/1994 | Brofman .................... B22F 3/11 |
| | | | 228/119 |
| 5,401,088 A | * | 3/1995 | Rubel .................... B62D 55/26 |
| | | | 305/187 |
| 5,533,796 A | * | 7/1996 | Beeley ................ B62D 55/244 |
| | | | 305/166 |
| 5,641,214 A | * | 6/1997 | Kafka .................. B62D 55/286 |
| | | | 305/180 |
| 6,505,897 B1 | | 1/2003 | Kanzler |
| 2003/0006646 A1 | * | 1/2003 | Musselman ............ B62D 55/28 |
| | | | 305/180 |
| 2018/0327037 A1 | * | 11/2018 | Blackburn ............. B62D 55/28 |

OTHER PUBLICATIONS

International Preliminary Report on Patentability (Application No. PCT/EP2019/054256) dated Aug. 25, 2020 (with English translation).

* cited by examiner

DEVICE FOR ATTACHING A CRAWLER TRACK MEMBER OF A CRAWLER TRACK TO A CRAWLER BELT OF THE CRAWLER TRACK

CROSS REFERENCE TO RELATED APPLICATIONS

This application is a continuation of International Application No. PCT/EP2019/054256 filed Feb. 21, 2019, which designated the United States, and claims the benefit under 35 USC § 119(a)-(d) of German Application No. 20 2018 104 420.6 filed Jul. 31, 2018, the entireties of which are incorporated herein by reference.

FIELD OF THE INVENTION

The present invention relates to a device for attaching a crawler track member of a crawler track to a crawler belt of the crawler track, and to a crawler belt and/or a crawler track having a device of this kind.

BACKGROUND OF THE INVENTION

Devices for attaching a crawler track member, such as a crawler web, for example, of a crawler track to a crawler belt of the crawler track are known in the art.

Devices known in the art comprise a strut and screws, wherein the crawler belt is arranged between the strut and the crawler web and multiple openings are present in the crawler belt through which the screws engage, so that the screws connect the strut to the crawler web and the crawler track is thereby clamped between the strut and crawler web. The strut and the crawler web in this case extend along their longitudinal extents parallel to one another. Further devices known in the art additionally provide for a spacer sleeve in the openings, for example.

The disadvantage of these devices is that the movement of the crawler belt during vehicle operation causes the openings to deform into elongate holes, as a result of which, particularly, when the crawler track is used on a piste vehicle, water or snow penetrates the openings in the crawler belt and between layers of the crawler belt and forms ice bubbles, as a result of which the crawler belt is destroyed by layers of the crawler belt becoming detached.

SUMMARY OF THE INVENTION

The problem addressed by the present invention is that of providing an alternative device for attaching a crawler track member of a crawler track to a crawler belt of the crawler track, in particular, to improve the device in such a manner that a comparatively longer service life or deployment time of a crawler belt is achieved.

The present invention is based on a device for attaching a crawler track member of a crawler track to a crawler belt of the crawler track using a press-in element and a connection element, wherein the press-in element comprises a plate-like main body having a continuous opening, for example, wherein when the press-in element is arranged on the crawler belt, the connection element for connecting the crawler track member to the crawler belt engages through the continuous opening. The continuous opening is, for example, cylinder-shaped, e.g. cylindrical in design. For example, the continuous opening is configured as a bore and/or perforation in the main body. Advantageously, the continuous opening is adapted to the connection element of the device, e.g. to an external dimension, e.g. an outer diameter. The continuous opening is, in particular, completely enclosed by the remaining main body. For example, the continuous opening is present on the main body in the form of a bore, in particular, a continuous bore.

The main body of the press-in element takes the form of an annular disc, for example. The main body has, for example, a thickness of between 1 mm and 10 mm, e.g. between 2 mm and 5 mm, in particular between 3 mm and 5 mm. The thickness of the main body is, for example, 1 mm, 1.5 mm, 2 mm, 2.5 mm, 3 mm, 3.2 mm, 3.3 mm, 3.4 mm, 3.5 mm, 4 mm, 4.5 mm or 5 mm, in particular 3.1 mm. An outer diameter of the main body is, for example, between 40 mm and 100 mm, between 40 mm and 80 mm, or between 40 mm and 60 mm. The outer diameter is, for example, 40 mm, 45 mm, 55 mm or 60 mm, in particular 50 mm. A diameter of the opening in the main body is, for example, greater than 8 mm, e.g. greater than 10 mm, in particular greater than 12 mm, e.g. 13 mm.

The device is advantageously configured to connect crawler belt ends of a crawler belt. The crawler track member of the crawler track is present as a crawler web of the crawler track, for example.

The crawler belt is produced, for example, from an elastic, in particular elastomer, base material, e.g. rubber. For a transfer of acceleration and braking forces from a drive wheel to the chassis, in particular the crawler track, a tensioning mechanism is formed, particularly, continuously along a longitudinal extent of the crawler belt is embedded in the crawler belt, e.g. in the elastomer material of the main track. The tensioning mechanism is, for example, configured as a fabric strip, e.g. made of synthetic fibers and/or metal fibers, e.g. steel fibers. The crawler belt advantageously comprises multiple fabric strip layers. The fabric strip layers are advantageously spaced apart from one another by means of the elastomer material. For example, the fabric strip layers are embedded in the elastomer material. The crawler belt may comprise two or more different elastomer materials. For example, a first elastomer material forms a sleeve of the crawler belt in which the fabric strip layers and a further elastomer material are present, in which material the fabric strip layers are embedded, for example. Fabric structures of different fabric strip layers are advantageously arranged on the crawler belt to run in an offset manner, e.g. transversely to one another.

The crawler track is, for example, a crawler belt with engagements for a drive wheel and with tracking elements which are provided on an inside of the crawler belt to guide a chassis of the crawler vehicle in a track running in the direction of travel of the crawler belt. A plurality of devices, e.g. attachment mechanisms, is advantageously configured on the crawler belt, each of which is provided to attach a crawler web to an outer side of the crawler belt and transversely to the direction of travel of the crawler belt. An attachment mechanism of the crawler belt is, for example, present in the form of an opening, e.g. a continuous opening, e.g. a through-opening. It is also conceivable for the crawler track to be provided for use with a side track co-running in parallel.

The focal point of the present invention should be regarded as being that the press-in element comprises multiple holding elements projecting from the main body, wherein the holding elements are configured in such a manner that when they are arranged on the crawler belt they penetrate multiple material layers of the crawler belt, in that the holding elements displace material of the material layers, in particular, transversely to the penetration direction. In this way, a transmission of force from the crawler track member via the device to the crawler belt, or vice versa, is improved, meaning that comparatively smaller forces, e.g. shear forces, act between the connection element and the attachment mechanism, e.g. opening, of the crawler belt, as a result of which an elongation, e.g. elongate hole formation, of the opening is at least delayed. The force in this case acts from outside, for example, e.g. from a base via which the crawler track of the crawler belt is moved or, for example, through the crawler belt on the crawler track member, e.g. on the crawler web.

When they are arranged on the crawler belt, the holding elements advantageously engage through multiple material layers of the crawler belt. In particular, the holding elements are threaded through multiple material layers of the crawler belt when they are arranged on the crawler belt.

By way of example, a material layer is configured as a fabric, e.g. as a fabric strip, in particular, as a metal fabric. By way of example, the holding elements do not cut through certain material layers when they are arranged on the crawler belt, in particular, the holding elements do not cut through the fabric layers. Advantageously, when they are arranged on the crawler belt, the holding elements do not cut through or sever a fabric layer, in particular, all fabric layers. The holding elements are advantageously configured in such a manner that when they are arranged on the crawler belt they penetrate between free areas of the fabric of a fabric layer, e.g. a fabric structure of the fabric layer, and displace, move and/or compact the fabric, in particular, transversely to the penetration direction, but advantageously do not sever or cut through the fabric. In this way, the press-in element is connected to the crawler belt, in particular, to the fabric layers of the crawler belt, in an interconnected manner, e.g. hooked in and/or suspended. The holding elements are preferably configured in such a manner that they penetrate the elastic material of the crawler belt in the arranged state and also cut through the elastic material where appropriate.

The main body of the press-in element is configured as an annular disc, for example, e.g. as a spacer disc and/or as a washer. For example, the main body has a round, elliptical or oval profile. It is also conceivable for the main body to have a strip-like or strut-like design. For example, the main body has an angular, e.g. rectangular, in particular square, profile. The main body advantageously comprises a single through-opening. However, it is also conceivable for the main body to have two, three, four or more through-openings. If the main body comprises multiple through-openings, these are advantageously spaced apart from one another on the main body. For example, the through-opening is in the center of the main body.

By way of example, the main body comprises a first and a second main side, wherein the main sides are opposite and spaced apart from one another. The through-opening advantageously extends from the first main side to the second main side. For example, the through opening in each main side has an opening and/or recess in the corresponding main side.

The press-in element is preferably configured between the crawler belt and the crawler track member in the state arranged on the crawler belt. By way of example, when arranged on the crawler belt the press-in element is, particularly, in direct contact with the crawler track member. It is also conceivable, however, for the press-in element and the crawler track member to be spaced apart from one another and, for example, to enclose the crawler belt between them.

Advantageously, there are 2, 3, 4, 5, 6, 7, 9, 10 or more holding elements, in particular 8 holding elements, on the main body of the press-in element. There are preferably more than two, more than three, more than four, more than eight or more than ten, in particular more than five, holding elements on the main body.

It is also advantageous for the holding elements to be arranged spaced apart from one another on the main body. All holding elements are advantageously present on the first main side of the main body projecting from this first main side. All holding elements preferably project in a same direction. For example, the holding elements project perpendicularly to a plane of extent of the first main side from the first main side. It is also conceivable for the holding elements, in particular, for all holding elements, to be arranged projecting on the main body in different directions to one another, for example, projecting from the first main side of the main body. It is also conceivable for the holding elements, in particular, for all holding elements, to be present on the main body projecting spherically or cylindrically.

It has also proved advantageous for the holding elements to be configured in a diminishing and/or tapering manner starting from the main body. In this way, an attachment, e.g. a pressing-in of the press-in element on the crawler belt is made comparatively easier.

In an advantageous embodiment of the press-in element of the device, a holding element is configured in a pin-like, needle-like, pyramid-shaped and/or conical manner.

All holding elements are advantageously similar, in particular of the same or identical design. It is also conceivable, however, for the holding elements, in particular, for all holding elements, to be differently designed to one another. For example, precisely two or precisely three different embodiments of holding elements are, in particular, configured on the main body. It is conceivable for two or more holding elements to be designed with different lengths.

It is furthermore proposed that one end of a holding element is tapered, rounded off and/or pointed. The tapered end of the holding element is advantageously spaced apart from the main body, in particular, from the main sides of the main body.

The holding elements project from the first main side by between 8 mm and 14 mm, e.g. by between 8 mm and 12 mm, for example. A total height of the press-in element comprising the main body and the holding element starting from the second main side of the main body up to the tapered end of the holding element is, for example, in a region between 10 mm and 100 mm, e.g. between 10 mm and 40 mm, e.g. between 10 mm and 30 mm, e.g. between 10 mm and 20 mm, e.g. between 12 mm and 16 mm. The total height of the press-in element is, for example, 12 mm, 12.5 mm, 13 mm, 14.5 mm or 15 mm, in particular 14 mm.

A diameter of a truncated conical holding element in the attachment region to the main body of the press-in element is, for example, between 4 mm and 8 mm, in particular in a region of roughly 6 mm.

It is furthermore conceivable for the main body and the holding elements of the press-in element to be integrally configured. For example, the press-in element, in particular, the main body and the holding elements, are formed from metal, e.g. from die-casting and/or from plastic. It is conceivable for the press-in element to be present as an injection-molded and/or die-cast component. It is also conceivable for the press-in element to be forged.

It is also advantageous for the connection element to be designed to connect the press-in element to the crawler belt and the crawler track member. The connection element is configured as a pin, a bolt, a rivet or a screw, for example.

It is conceivable for the connection element to be present as a threaded pin. It is also conceivable for the connection element to be configured in a clamp-like manner, e.g. in the form of a clamp. The connection element is advantageously designed to connect the crawler belt ends to the press-in element and/or to connect the press-in element to the crawler belt and the crawler track member of the crawler track.

In an advantageous modification of the present invention, the device has a counter-element, wherein in the arranged state of the device the counter-element and the main body of the press-in element are spaced apart by the crawler belt. The counter element preferably has a continuous opening, e.g. a hole, wherein in the arranged state on the crawler belt, the connection element engages through the continuous opening. It is also conceivable for the connection element and the counter element to be connected to one another, e.g. integrally configured. The counter-element is configured as an annular disc and/or as a washer, for example. The counter-element and the main body of the press-in element are of identical design.

For example, the counter-element has a round, elliptical or oval profile. It is also conceivable for the counter-element to have a strip-like or strut-like design. For example, the counter-element has an angular, e.g. rectangular, in particular square, profile. The counter-element advantageously comprises a single, e.g. continuous, opening. However, it is also conceivable for the counter-element to have three, four or more openings. If the counter-element comprises multiple openings, these are advantageously configured spaced apart from one another on the counter-element. For example, an opening, in particular, the opening, is in the center of the counter-element. The counter-element and the press-in element are preferably adapted to one another, particularly, in relation to the number of openings present.

The counter element is advantageously larger in design, viewed in an outer extent, than an outer dimension of the main body of the press-in element, in particular, in the same direction of extent when arranged on the crawler belt. An annular disc-like counter-element advantageously has an outer diameter which is greater than an outer diameter of the main body of the press-in element. An annular disc-like counter-element has an outer diameter of between 50 mm and 80 mm, e.g. roughly 57 mm, for example. Advantageously, a thickness of the counter-element is the same or larger by comparison with a thickness of the main body of the press-in element. By way of example, the thickness of the counter-element is in a range between 2 mm and 10 mm, e.g. between 3 mm and 8 mm. The thickness of the counter-element is 2 mm, 3 mm, 4 mm, 4.5 mm, 5.5 mm, 6 mm, 6.5 mm, 7 mm, 8 mm or 10 mm, in particular 5 mm, for example.

It is also advantageous for the main body to have a positioning member by means of which the main body can be positioned in the arranged state on the crawler belt relative to the crawler track member. In this way, assembly of the device is made easier.

The main body is advantageously coupled by means of the positioning member, in particular, straight or directly, to the crawler track member of the crawler track. The main body can preferably be positioned in the arranged state on the crawler belt, particularly, by the positioning member on the crawler track member, or vice versa.

The positioning member is, for example, configured in the form of a recess, in the form of a notch, in the form of a ridge, in the form of a pin and/or in the form of a bolt.

For example, the main body is configured in a lockable manner to the crawler track member in the arranged state on the crawler belt by means of the positioning member. The positioning member is configured as a bolt, as a pin and/or as a blind hole, for example. The positioning member is advantageously configured on the second main side of the main body. For example, the main body comprises a cut-out and/or a recess in which the positioning member can be used, e.g. can be inserted and/or pressed in. In this way, an improved force fit between the positioning member and the base body can be achieved. It is further conceivable for the press-in element to have two, three or more positioning members. For example, the positioning members are spaced apart from one another. In this way, a rotation of the press-in element relative to the crawler track member is avoided in the arranged state.

An advantageous embodiment of the present invention is a crawler belt with a device according to one of the variants referred to above.

It has further proved advantageous for a length of the holding elements of the press-in element to be adapted to a thickness of the crawler belt in such a manner that the holding elements do not penetrate the crawler belt in the arranged state viewed in the thickness direction of the crawler belt. However, it is also conceivable for the holding elements to be present in a manner such that, for example, they completely penetrate the crawler belt in the arranged state, in particular, viewed in the direction of a thickness of the crawler belt. A length of the holding elements corresponds to the thickness of the crawler belt, for example. It is also conceivable for the length of a holding element to be greater than a thickness of the crawler belt, so that the tapered end of the holding element in the arranged state of the press-in element on the crawler belt projects from an outer side of the casing of the crawler belt.

For example, a length of the holding elements is configured in such a manner that an extent of the holding elements in a direction perpendicular to the plane of extent of the first main side from the first main side to the end of the holding element spaced apart from the first main side is smaller than, or equal to, the thickness of the crawler belt. The crawler belt advantageously extends along a length, a width and a thickness. The length of the crawler belt is viewed in a longitudinal extent and/or in the running direction of the crawler belt. The width of the crawler belt can be seen perpendicular to the running direction of the crawler belt and in the direction of a longitudinal extent of a crawler track member, e.g. a crawler web, arranged on the crawler belt.

In an advantageous embodiment, the main body has a raised design on the first main side in a region about the continuous opening. For example, the main body comprises a sealing member, e.g. in the form of a bead, in order to seal the opening of the crawler belt, particularly, in the arranged state on the crawler belt. For example, an opening region of the continuous opening on the first main side is continuously enclosed by means of a sealing member, e.g. in a bead-like manner. The sealing member, e.g. the bead, engages in the arranged state with the opening in the crawler belt, for example, in particular, with the crawler belt, e.g. with the elastic material of the crawler belt. In this way, the press-in element on the crawler belt can be adjusted. The sealing member, for example, the bead, advantageously closes off the opening in the crawler belt in the arranged state on the crawler belt, so that comparatively little water or moisture can penetrate the opening of the crawler belt from the outside. It is furthermore conceivable for a comparable sealing member to be configured about the opening of the counter-element, so that the opening of the crawler belt is sealed from both sides in the arranged state of the device.

A further alternative modification of the present invention is a crawler track with a crawler belt and/or with a device as claimed in one of the variants mentioned above.

An alternative embodiment of the present invention is a crawler vehicle, in particular, a crawler vehicle with a crawler track, having a crawler belt and/or having a device according to one of the preceding variants.

The category of crawler or track vehicles includes, in particular, snow vehicles such as piste vehicles, cross-country ski trail grooming vehicles, and/or piste groomers, for example.

BRIEF DESCRIPTION OF THE DRAWINGS

Multiple exemplary embodiments are explained in greater detail with the help of the schematic drawings below with an indication of further details and advantages.

DETAILED DESCRIPTION OF THE DRAWINGS

Figure 1:
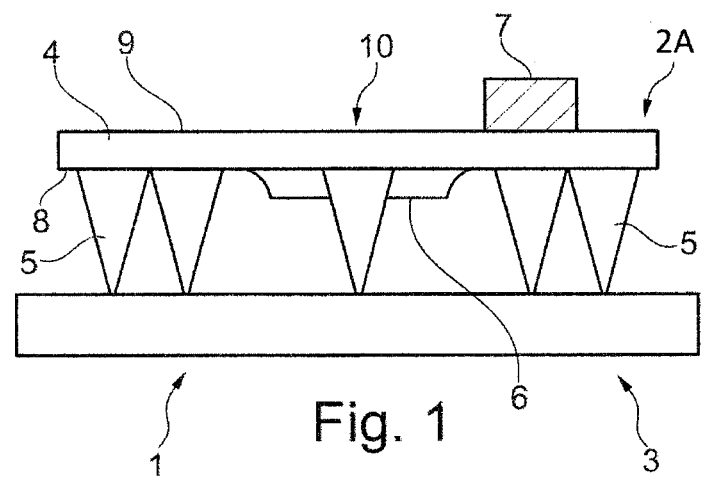
FIG. 1 shows a side view of a device according to the present invention.

FIG. 1 shows a first variant of a device 1 according to the present invention comprising a press-in element 2A and a counter element 3.

For the sake of transparency, the same reference numbers are used below for different embodiments of a device and, in particular, of a press-in element. The individual variants described below can be advantageously flexibly combined with a further variant which is different thereto.

The counter element 3 is, for example, configured as a washer with a centrally disposed through-hole, for example. The press-in element 2A comprises a main body 4, holding elements 5, a sealing member 6, and a positioning member 7.

The main body 4 is advantageously configured in a disc-like or plate-like manner and has a first main side 8 and a second main side 9 which are opposite and spaced apart from one another. The first and the second main side 8, 9 advantageously form main planes of extent of the main body 4. The main body 4 moreover comprises a continuous opening 10. On the second main side 9, the positioning member 7 projects from the second main side 9, for example.

The holding elements 5 project from the first main side 8 of the main body 4. The holding elements 5 have a conical or truncated conical design, for example. The holding elements 5 are spaced apart from one another along a circular arc, for example, on the first main side 8 of the main body 4. The circular arc has a circle center which, for example, coincides with an axis of symmetry, e.g. an axis of rotation of the main body 4.

The sealing member 6 is advantageously bead-like in design. The sealing member 6 encloses an edge of the opening 10 of the main body on the first main side 8 in a completely circumferential manner. The sealing member 6 is raised from a main plane of extent of the first main surface 8. An inner region 11 of the sealing member 6 has a sleeve-like, e.g. hollow cylindrical, configuration, for example. A wall thickness of a hollow cylindrical sealing member 6 is, for example, between 1 mm and 5 mm, e.g. 2 mm. A transition 12 of the inner region 11 of the sealing member 6 to the main plane of extent of the first main surface 8 is rounded off, for example.

Figure 2:
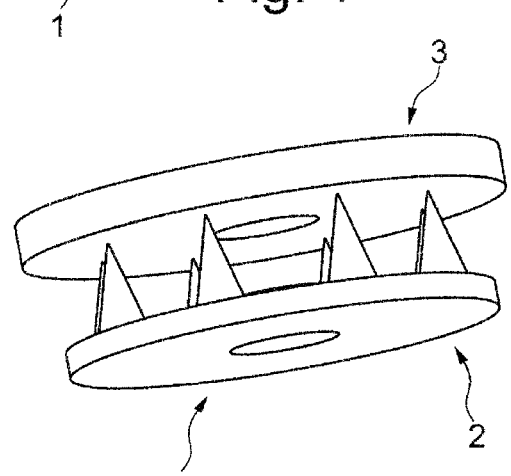
FIG. 2 shows a perspective view at an oblique angle from the side from above of a further variant of the device.
Figure 3:
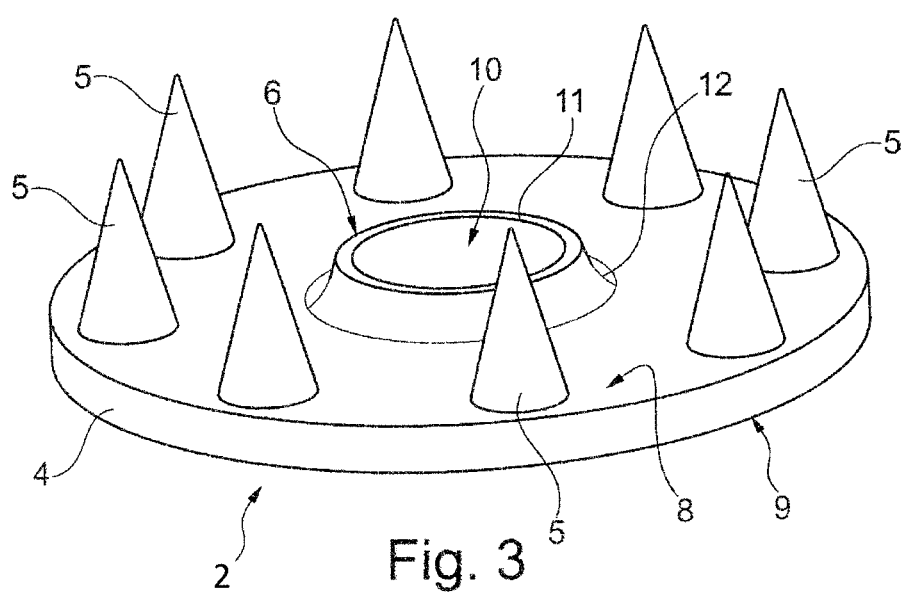
FIG. 3 shows a perspective view at an oblique angle from the side from below of the press-in element of the device according to FIG. 2.

A further device 13 with a further variant of a press-in element 2 is depicted in FIGS. 2, 3.

Figure 4:
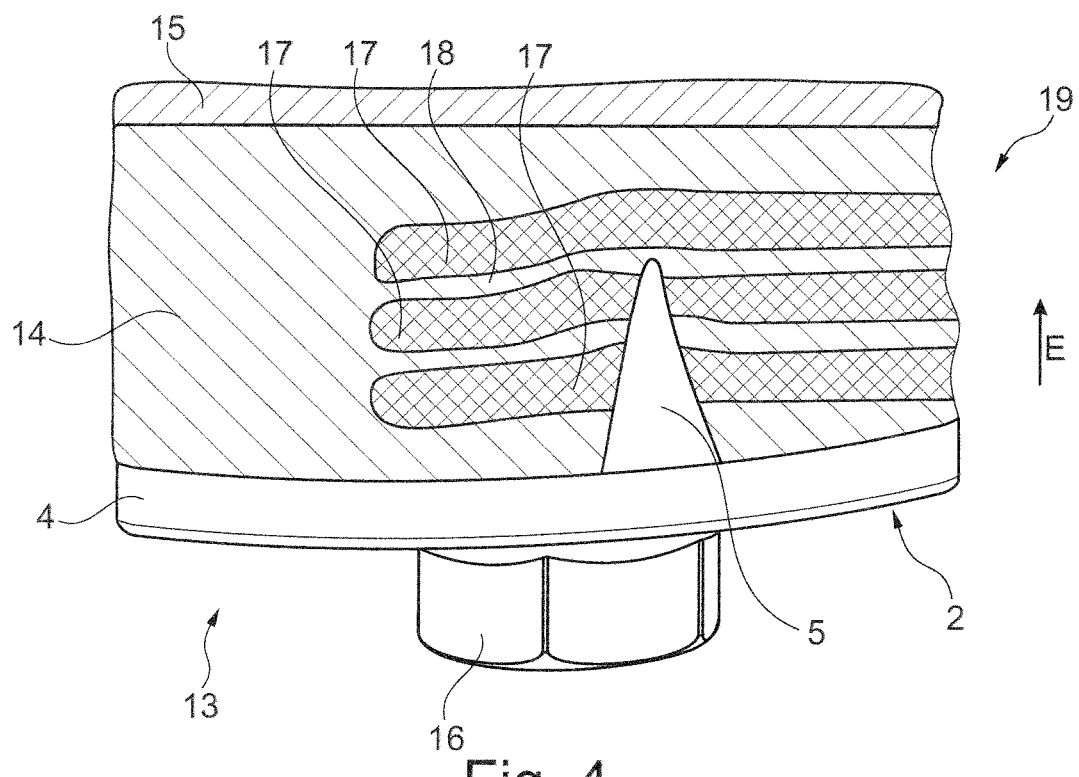
FIG. 4 shows a sectional view through the crawler belt of a device according to FIG. 2 arranged on the crawler belt.

FIG. 4 shows a crawler track 19. On the crawler track 19, the device 13 is present in an arranged state on a crawler belt 14, wherein by means of the device a crawler track member in the form of a crawler web 15 is attached to the crawler belt 14. The press-in element 2 in this case is connected to the crawler web 15 by means of a connection element in the form of a screw 16. In the sectional view of the crawler web 15 shown in FIG. 4, there are multiple fabric layers 17 of the crawler belt 14, which are embedded in an elastic material 18 of the crawler belt 14.

The holding elements 5 are advantageously configured in such a manner that in the arranged state of the press-in element 2 on the crawler belt 14 the holding elements 5 penetrate a fabric structure of the fabric layers 17, so that the holding elements 5 penetrate the fabric structure and advantageously compress or displace the fabric structure of the fabric layers transversely to the penetration direction E in this case. In this way, a severing of the fabric layers is preferably avoided, as a result of which a weakening of the crawler belt 14 is advantageously reduced. A comparatively strong anchoring of the press-in element 2 with the crawler belt 14 is also thereby effected.

Figure 5:
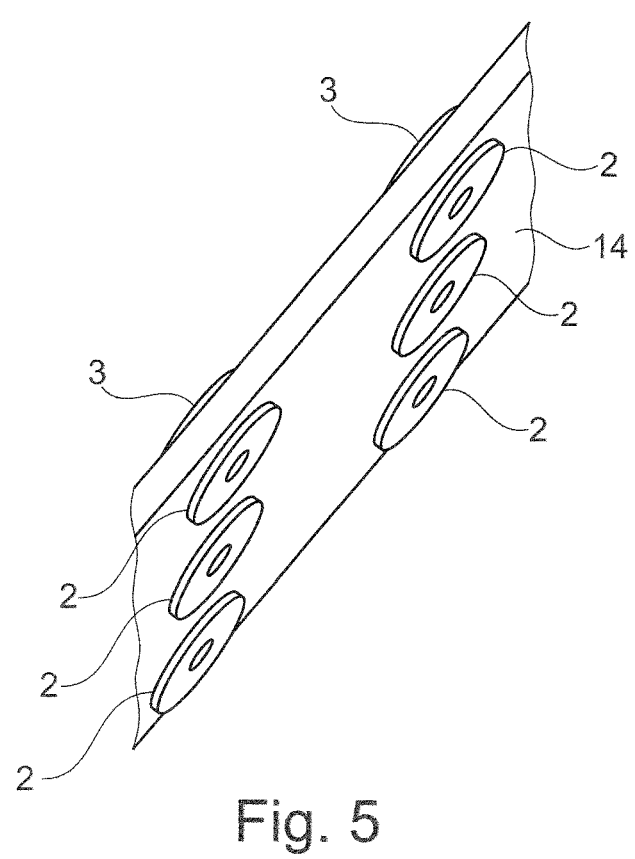
FIG. 5 shows a perspective view of devices according to FIG. 2 arranged on the crawler belt.

As depicted in FIG. 5, multiple, in particular three, devices 13 are advantageously arranged on the crawler belt 14, in order to attach a crawler track member (not shown in FIG. 5) to the crawler belt 14.

LIST OF REFERENCE NUMBERS

1 Device
2A Press-in element
2 Press-in element
3 Counter-element
4 Main body
5 Holding element
6 Sealing member
7 Positioning member
8 Main side
9 Main side
10 Opening
11 Region
12 Transition
13 Device
14 Crawler belt
15 Crawler web
16 Screw
17 Fabric position
18 Material
19 Crawler track

The invention claimed is:

1. A device for attaching a crawler track member of a crawler track to a crawler belt of the crawler track having a press-in element and a connection element, wherein the press-in element comprises a main body having a continuous opening, wherein when the press-in element is arranged on the crawler belt, the connection element for connecting the crawler track member to the crawler belt engages through the continuous opening, wherein the press-in element comprises multiple holding elements projecting from the main body, wherein the holding elements are configured in such a manner that when they are arranged on the crawler belt, they penetrate multiple material layers of the crawler belt, wherein the holding elements displace material of the material layers transversely to the penetration direction, wherein the holding elements when arranged on the crawler belt penetrate the crawler belt completely, such that the press-in element is in direct contact with the crawler track member.

2. The device for attaching a crawler track member of a crawler track to a crawler belt of the crawler track as claimed in claim 1, wherein the holding elements are arranged in a circle shape around the opening and are spaced apart from one another.

3. The device for attaching a crawler track member of a crawler track to a crawler belt of the crawler track as claimed in claim 1, wherein the holding elements are configured in a diminishing and/or tapering manner starting from the main body.

4. The device for attaching a crawler track member of a crawler track to a crawler belt of the crawler track as claimed in claim 1, wherein the holding elements are arranged spaced apart from one another on the main body.

5. The device for attaching a crawler track member of a crawler track to a crawler belt of the crawler track as claimed in claim 1, wherein a holding element is configured in a pin-like, needle-like and/or conical manner.

6. The device for attaching a crawler track member of a crawler track to a crawler belt of the crawler track as claimed in claim 1, wherein one end of a holding element is tapered, rounded off and/or pointed.

7. The device for attaching a crawler track member of a crawler track to a crawler belt of the crawler track as claimed in claim 1, wherein the connection element is configured to connect the press-in element to the crawler belt and the crawler track member of the crawler track.

8. The device for attaching a crawler track member of a crawler track to a crawler belt of the crawler track as claimed in claim 1, further comprising a counter-element, wherein in the arranged state of the device the counter-element and the main body of the press-in element are spaced apart by the crawler belt.

9. The device for attaching a crawler track member of a crawler track to a crawler belt of the crawler track as claimed in claim 1, wherein the main body has a positioning member by means of which the main body can be positioned in the arranged state on the crawler belt relative to the crawler track member.

10. A crawler belt having a device as claimed in claim 1.

11. A crawler track having a crawler belt as claimed in claim 10.

12. A track vehicle having a crawler track as claimed in claim 11.

13. A track vehicle having a crawler belt as claimed in claim 10.

14. A track vehicle having a device as claimed in claim 1.

* * * * *